(12) United States Patent
Albou

(10) Patent No.: US 7,918,595 B2
(45) Date of Patent: Apr. 5, 2011

(54) LIGHTING MODULE FOR MOTOR VEHICLE HEADLIGHT

(75) Inventor: Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 336 days.

(21) Appl. No.: 12/144,736

(22) Filed: Jun. 24, 2008

(65) Prior Publication Data
US 2008/0316763 A1 Dec. 25, 2008

(30) Foreign Application Priority Data
Jun. 25, 2007 (FR) ...................................... 07 04559

(51) Int. Cl.
*F21V 7/00* (2006.01)

(52) U.S. Cl. ......... 362/518; 362/297; 362/517; 362/545

(58) Field of Classification Search .................. 362/545, 362/240–241, 297–298, 346–347, 516–518, 362/800
See application file for complete search history.

(56) References Cited

U.S. PATENT DOCUMENTS

| 6,966,675 B2* | 11/2005 | Albou | 362/298 |
|---|---|---|---|
| 7,347,600 B2 | 3/2008 | Albou | |
| 7,410,282 B2* | 8/2008 | Eichelberger et al. | 362/545 |
| 2005/0094402 A1* | 5/2005 | Albou | 362/297 |
| 2007/0236951 A1 | 10/2007 | Albou | |
| 2008/0137358 A1 | 6/2008 | Albou | |

FOREIGN PATENT DOCUMENTS

| EP | 1471305 A1 | 10/2004 |
|---|---|---|
| EP | 1528312 A1 | 5/2005 |
| FR | 2899668 A1 | 10/2007 |

* cited by examiner

*Primary Examiner* — John A Ward
(74) *Attorney, Agent, or Firm* — Jacox, Meckstroth & Jenkins

(57) ABSTRACT

A lighting module for a motor vehicle headlight, designed to give a beam with cutoff, and comprising at least one light source, a collecting mirror, a bender having a reflective surface and a cutoff edge, a return mirror, for producing towards the front the output beam with cutoff the surfaces of the collecting mirror, of the bend and of the return mirror being conjugate surfaces such that the collecting mirror converts a spherical wave issuing from the center of the source into a wave surface reducing to a two-dimensional curve, convex towards the front, the cutoff edge of the bender is merged with this curve, the return mirror converts the above wave surface into at least one cylindrical wave surface of vertical axis having as its cross-section a curve.

22 Claims, 5 Drawing Sheets

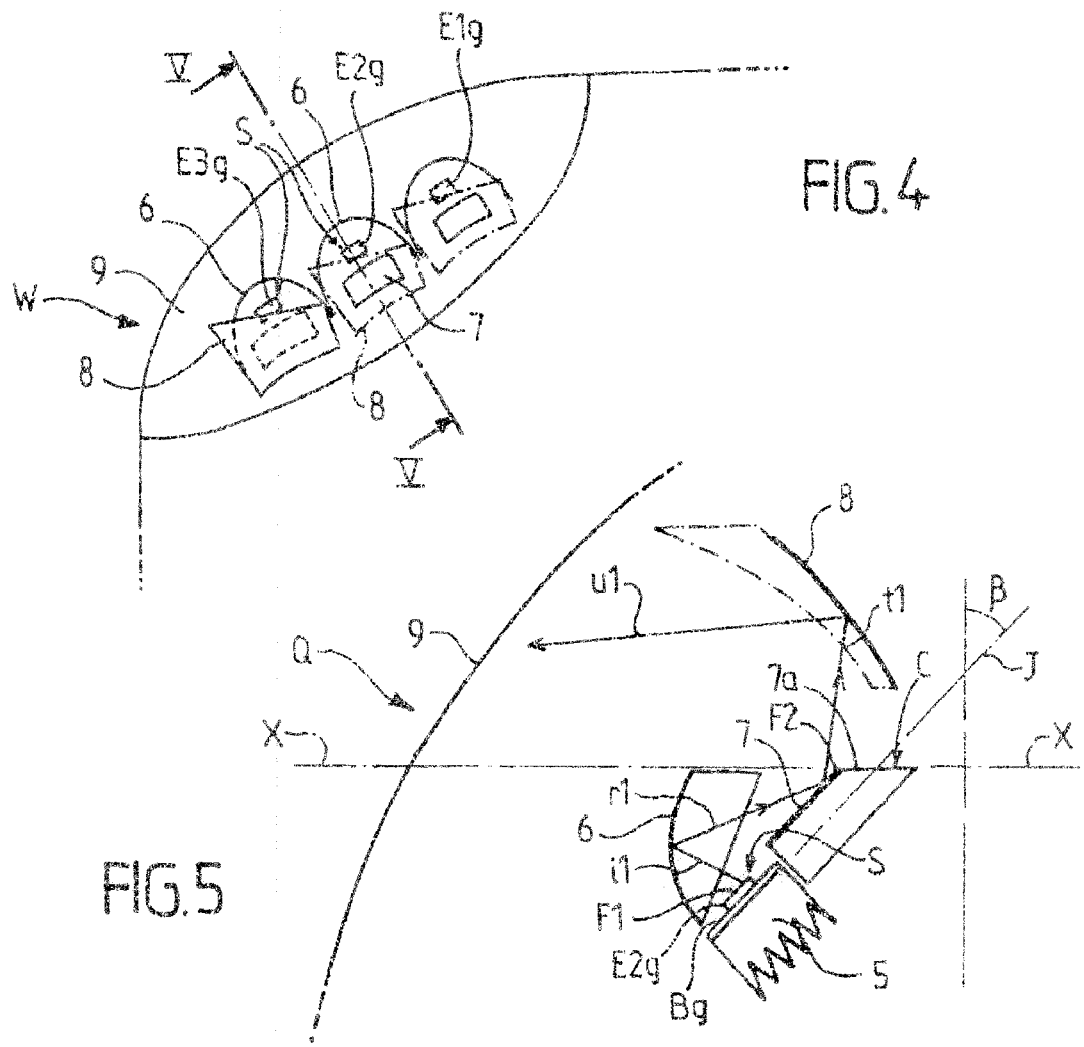
FIG.4
FIG.5
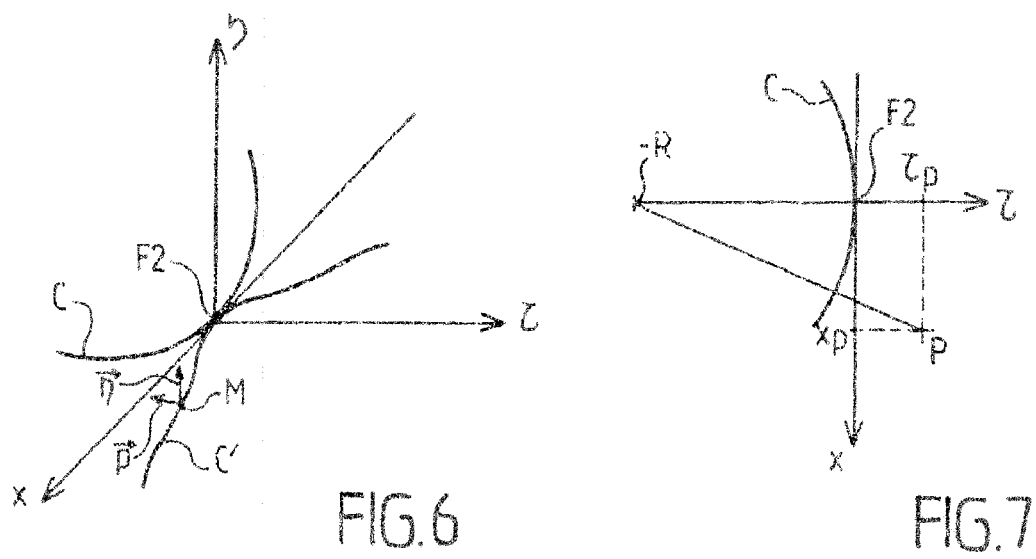
FIG.6
FIG.7

LIGHTING MODULE FOR MOTOR VEHICLE HEADLIGHT

CROSS-REFERENCE TO RELATED APPLICATIONS

This application claims priority to French Application No. 07 04 559 filed Jun. 25, 2007, which application is incorporated herein by reference and made a part hereof.

BACKGROUND OF THE INVENTION

1. Field of the Invention

The invention relates to a lighting module, for a motor vehicle headlight, designed to give a cutoff beam. A type of module, for example according to U.S. Pat. No. 6,966,675, which is incorporated herein by reference and made a part hereof, comprises:
at least one light source,
a collecting mirror, for example of the ellipsoidal type, having a first focus at which, or in the vicinity of which, the light source is disposed in order to illuminate towards the collecting mirror, and a second focus situated on the optical axis of the module;
a bender having a reflective surface and a cutoff edge passing through the first focus of the collecting mirror,
a return mirror, for example of the parabolic type, in order to produce towards the front an output beam with cutoff, the return mirror having a focus preferably merged with or situated in the vicinity of the second focus of the collecting mirror, the cutoff edge of the bender passing through the focus of the return mirror, or in its vicinity, the return mirror being situated essentially above the collecting mirror when the module is in place on the vehicle.

2. Description of the Related Art

The assignee hereof also filed a French patent applicant FR 06 03 062 on Apr. 6, 2006, corresponding to U.S. Patent Publication 2007/0236951 published Oct. 11, 2007, according to which a return mirror situated below the collecting mirror can be combined with a second return mirror situated essentially above a second collecting mirror. This is incorporated herein by reference and made a part hereof.

The lighting modules of the prior art, with a return mirror of the parabolic type situated essentially above the collecting mirror, do not at the present time make it possible to obtain broad beams in a satisfactory manner.

SUMMARY OF THE INVENTION

The aim of the invention is in particular to provide a lighting module for obtaining a broad beam, with cutoff.

Preferably, the cutoff of the beam must be sharp, even if the light source is inclined with respect to the longitudinal axis of the vehicle, in particular in a curved headlight.

It is also desirable for the design of the module to facilitate its manufacture, in particular with regard to the electrical connections of the light source, especially when this source is formed by light emitting diodes or LEDs.

More particularly, the object of the invention is a lighting module for a motor vehicle headlight, designed to give a beam with cutoff, in particular a low beam (also called dipped beam or passing beam), this module comprising:
at least one light source,
a collecting mirror,
a bender having a reflective surface and a cutoff edge, the bender being formed by a portion of a cylinder turning its convexity towards the collecting mirror, and
a return mirror for producing towards the front the output beam with cutoff.

Advantageously, the surfaces of the collecting mirror, of the bender and of the return mirror are conjugate surfaces such that:
the collecting mirror converts a spherical wave issuing from the center of the source into at least one wave surface reducing to a two-dimensional curve, convex towards the front,
the cutoff edge of the bender is merged with this curve,
the return mirror converts the above wave surface into at least one cylindrical wave surface of vertical axis having as its cross-section a curve allowing the horizontal spread of the beam.

The convex reflective surface of the bender broadens the outgoing beam. The whole creates a broad outgoing beam with cutoff.

Preferentially, in order to improve the sharpness of the cutoff line, the bender has as its generatrix direction the intersection of the vertical left/right symmetry plane of the light source and the mid-plane of the source, and the generatrices of the portion of the cylinder forming the bender rest on the curve.

The lighting module according to the invention may comprise, in addition to the main characteristics that have just been mentioned in the previous paragraph, one or more additional characteristics among the following:
the return mirror is situated essentially above the collecting mirror when the module is in place on the vehicle; thus making it possible to create a cutoff delimiting the top part of the light beam emitted by the lighting module;
the light source is disposed so as to emit a light beam whose mean direction, in orthogonal projection onto a horizontal plane, is inclined with respect to the longitudinal axis of the vehicle and moves away from it towards the outside of the vehicle ("vehicle outside" means the side that moves away from the longitudinal axis of the vehicle);
the collecting mirror has a shape approaching an ellipsoidal shape, having a first focus at which, or in the vicinity of which, the light source is disposed in order to illuminate towards the collecting mirror, and a second focus situated on the optical axis of the module, the cutoff edge of the bender preferably passing through the second focus of the collecting mirror;
the return mirror has a shape approaching a parabolic shape, in order to produce towards the front the output beam with cutoff, the return mirror having a focus merged with, or situated in the vicinity of, the second focus of the collecting mirror, the cutoff edge of the bender passing through the focus of the return mirror, or in its vicinity;
the collecting mirror is determined so as to convert the spherical wave surface issuing from the center of the source into a toric wave surface corresponding to a bender with circular edge;
the return mirror is turned through an angle about the optical axis of the system in order to straighten up the emerging beam with respect to the horizontal;
the conjugate surfaces are determined so as to compensate for the inclination of the mean direction of emission of the source and to give an emerging beam whose axis is substantially less inclined than the axis of the module (represented, as illustrated below, by $\Delta d$ and $\Delta g$);
the conjugate surfaces are determined so as to compensate for the inclination of the mean direction of emission of the source and to give an emerging beam whose axis is substantially parallel to the geometric axis of the vehicle when the module is in place on the vehicle;

the light beam is formed by a light emitting diode comprising at least one flat emitter, or by several light emitting diodes, all the flat emitters of which are situated on the same plane;

the angular opening of the beam emerging from the module is at least 30° (or at least 40°) on each side of the axis of the beam.

The additional characteristics are associated, according to all possible combinations and in so far as these additional characteristics are not mutually exclusive, in various example embodiments of the object of the invention.

In the case of a light source formed by at least one light emitting diode with flat emitter, the mid-plane of the source is that of the flat emitter.

The invention also concerns a low beam headlight comprising at least one lighting module as defined previously. The headlight advantageously comprises as the light source light emitting diodes with flat emitters that are situated on the same plane, inclined horizontally with respect to the geometric axis of the vehicle. Preferably, the plane of the emitters is inclined horizontally with respect to the transverse direction, orthogonal to the geometric axis of the vehicle, at an angle preferably no more than 45°, for example between 2° and 40°.

More particularly, the low beam headlight is of the DBL type (dynamic bending light) and comprises modules that can be oriented so as to create a central zone of the beam with a V-shaped cutoff, and fixed modules with a horizontal cutoff line and sufficient beam width to frame the central zone in the extreme turning positions. The low beam headlight can comprise, towards the outside of the vehicle, at least two orientable modules and, towards the inside, three fixed broad-beam modules. The orientable modules can for example turn about a substantially vertical axis in order to follow the curvature of the road.

The invention also concerns a main-beam headlight comprising a lighting module described above but in which the return mirror is situated essentially below the collecting mirror when the module is in place on the vehicle. This light module of the main beam type thus makes it possible to create a cutoff delimiting the bottom part of the light beam emitted by the lighting module. This improves the qualities of the main beam while avoiding an excess of light close by on the road and adds additional light in the distance. Preferentially, this lighting module of the main beam type is associated with a lighting module of the low beam type, according to the invention or not.

These and other objects and advantages of the invention will be apparent from the following description, the accompanying drawings and the appended claims.

BRIEF DESCRIPTION OF THE ACCOMPANYING DRAWINGS

The invention consists, apart from the provisions disclosed above, of a certain number of other provisions that will be dealt with explicitly below with regard to example embodiments described with reference to the accompanying drawings but which are in no way limitative. In the drawings:

FIG. 4 is a diagram, to a larger scale, of the left-hand headlight of FIG. 3;

FIG. 5 is a vertical schematic section along the line V-V of FIG. 4, of a lighting module according to the invention;

FIG. 6 is a diagram in perspective of a trirectangular trihedron with wave surface curves;

FIG. 7 is a diagram for calculating the wave surface at the edge of a bender;

DETAILED DESCRIPTION OF THE PREFERRED EMBODIMENTS

Figure 1:
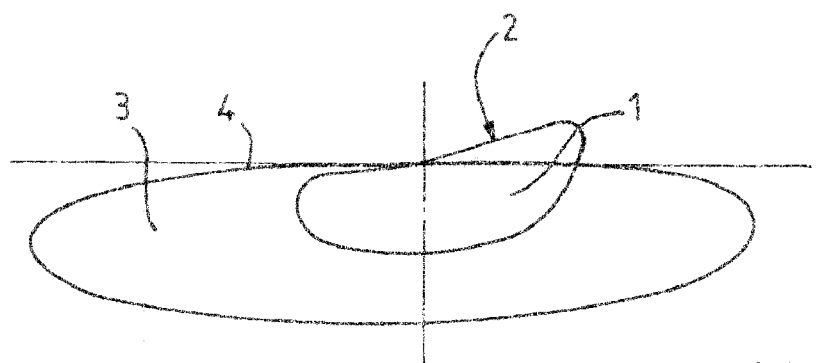
FIG. 1 is a diagram of the zone illuminated, on a screen orthogonal to the axis of the beam, by a low beam headlight of the DBL type according to the invention while the front wheels are oriented in a straight line.
Figure 2:
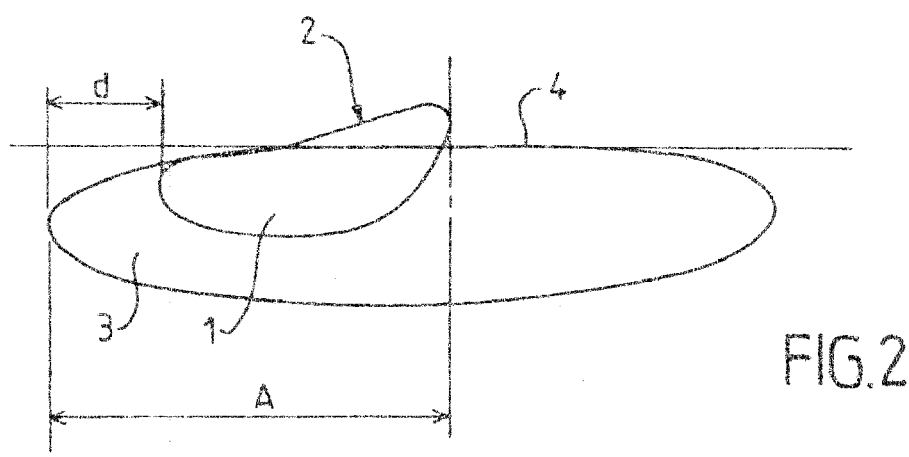
FIG. 2 shows the zone illuminated by the headlight of FIG. 1 for maximum turning of the front wheels of the vehicle towards the left.

Referring to the drawings, it is possible to see in FIGS. 1 and 2 traces of light beams on a screen situated at a distance from a headlight and orthogonal to the axis of the beam.

The diagram in FIG. 1 corresponds to a low beam comprising a central part 1 with more intense illumination delimited by a cutoff edge 2 in a V where the arm situated on the left is substantially horizontal and the arm situated on the right rises at an angle of 15° to the horizontal. This is a non-limitative angle value, since this angle may more generally be between 10° and 60°.

The beam also comprises a wider part 3, which on the right and left projects beyond the central part 1. The wider part 3 has a horizontal flat cutoff 4, situated at the same level as the horizontal arm of the V-shaped cutoff edge 2. The illumination in the wider part 3 is less intense than in the central part 1 but sufficient for the lateral zones.

In the case of a DBL (dynamic bending light) headlight at least the central part 1 can turn about a substantially vertical axis in order to follow the turning of the vehicle wheels.

FIG. 2 repeats the diagram in FIG. 1 but with the central part 1 moved to the maximum extent towards the left, following a turning of the front wheels to the left. The wider part 3 of the beam has not moved angularly since, according to the invention, it can be obtained with one or more fixed modules giving a broad beam.

The width of the beam must be sufficient so that the wider part 3 projects at least by a minimum distance d with respect to the central part 1 when the latter is moved to the maximum on one side.

The angular extent of the wider part 3 with respect to the longitudinal axis of the vehicle is at least 30° on each side of the axis, towards the outside of the vehicle. The extent A corresponds to the angle between the mean direction of the beam and the marginal rays. In addition, the horizontal flat cutoff line 4 must be sharp.

Figure 3:
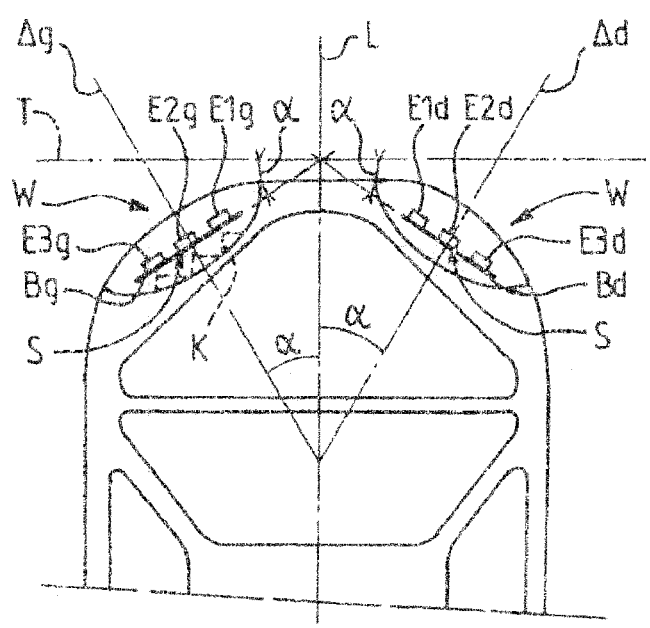
FIG. 3 is a schematic view in plan of the front of a vehicle with headlights with light sources inclined with respect to the transverse direction of the vehicle.

This problem of the production of a broad beam with sharp horizontal cutoff is complicated when the headlight W, as illustrated schematically in FIGS. 3 and 4, is installed aslant in a front corner of the vehicle. It is desirable for the light source or sources S to be disposed substantially parallel to the mean inclination of the headlight W, in order so as to allow their housing at a reduced depth, and for the aesthetic appearance of the headlight W.

The light source S is advantageously formed by several light emitting diodes, abbreviated to "LEDs", comprising flat emitters E1g, E2g, E3g on the left-hand side of the vehicle and E1d, E2d, E3d on the right-hand side of the vehicle. Preferably, the emitters disposed on the same side of the vehicle are situated on one and the same flat support Bg, or Bd. This arrangement facilitates manufacture, in particular the operations of connecting and soldering the terminals of the various emitters.

The traces of the flat supports Bg, Bd on a horizontal plane as illustrated in FIGS. 3 and 4 are inclined by an angle α with respect to the transverse direction T, orthogonal to the longitudinal axis L of the vehicle. Because of this, the mean direction Δg, Δd of the light beam emitted by each emitter forms an angle α with the longitudinal axis L of the vehicle.

If it were wished to keep the mean directions of the beams of each emitter parallel to the axis L whilst preserving the overall mean inclination of the headlight W illustrated in FIG. 3, it would be necessary to adopt an arrangement of the emitters in a staircase K, which would complicate manufacture and would not make it possible to follow, with the emitters, the mean line of the curved headlight.

FIG. 5 shows a lighting module Q according to the invention, with a light source S formed by at least one LED comprising at least one flat emitter E2g disposed on the flat support Bg inclined by an angle α (FIG. 3) with respect to the transverse direction T of the vehicle, and by an angle β with respect to the vertical direction. The angle β may be around 40°.

The light source S is disposed so as to illuminate towards the front and upwards. The terms "front" and "rear" are to be understood by looking at the normal direction of forward movement of the vehicle equipped with the module.

The arrangement of the LEDs on a single flat support Bg makes it possible to have a single radiator 5, on the side of the flat support Bg opposite to the LEDs, for all the LEDs.

A collecting mirror 6 of the ellipsoidal type is disposed at the front of the light source S and is turned towards the rear. This collecting mirror 6 comprises a first focus F1 at which, or in the vicinity of which, there is disposed the center of the light source S that illuminates towards the collecting mirror 6, and a second focus F2 situated on the optical axis X-X of the module.

The module comprises a bender 7 consisting of a portion of a reflective cylindrical wall convex towards the front, that is to say towards the left in FIG. 5. The generatrices of the bender 7 are parallel to the intersection J of the vertical left/right symmetry plane of the light source S, and the mid-plane of its flat support Bg. The inclination of the generatrices of the bender 7 to the vertical direction is thus the same as that of the flat support Bg. The top edge 7a of the bender 7, convex towards the front, constitutes the cutoff edge of the beam and passes through the second focus F2 of the collecting mirror 6, or in the vicinity of this focus.

A return mirror 8, of the parabolic type, is situated essentially above the collecting mirror 6. The reflective surface of the return mirror 8 is turned towards the front in order to produce the output beam with cutoff. The return mirror 8 has a focus merged with the second focus F2 of the collecting mirror 6, or situated in the vicinity of the second focus F2.

The bender 7, which forms a convex mirror towards the front, if favorable to the creation of a broad beam.

A lens 9, made from transparent material, glass or plastics material, is disposed in front of the elements of the lighting module.

Figure 10:
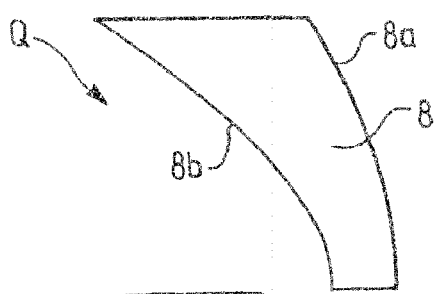
FIG. 10 is a schematic view of a module in the direction of the arrow X in FIG. 11.
Figure 11:
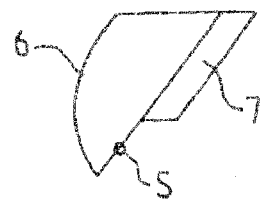
FIG. 11 is a plan view of the module in FIG. 10.
Figure 11:
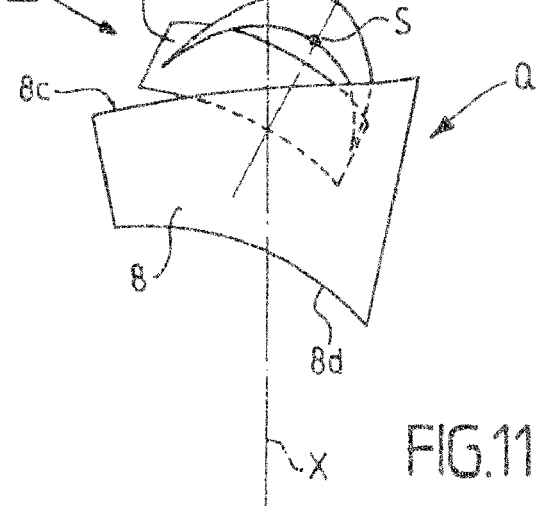
Figure 12:
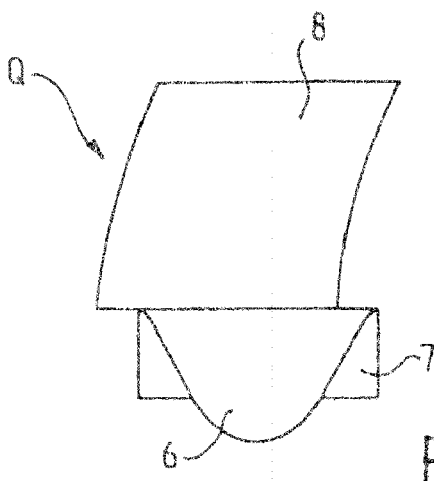
FIG. 12 is a view in the direction of the arrow XII in FIG. 11.

FIGS. 10-12 are views of a variant embodiment of a module according to the diagram in FIG. 5, with a slightly different relative arrangement of the bender and mirrors. The bender 7 is closer to the collecting mirror 6 than in FIG. 5, and the bottom edge of the return mirror 8 is situated in a horizontal plane that fits flush with the top edge of the collecting mirror 6 and the bender 7.

As can be seen in FIG. 11, in orthogonal projection on a horizontal plane, the light source S emits a light beam having a mean direction Δd that is inclined with respect to the direction of the geometric axis of a vehicle by an angle α when the module is in place on the vehicle.

The bender 7 formed by a portion of a cylinder having the intersection J as the direction of generatrices. This type of surface can be used for one or two modules producing the part of the beam situated most towards the outside of the vehicle.

However, in the case of slanting headlights P as in FIG. 3, this solution does not make it possible to straighten the beam and therefore to place all the LEDs on the same plane. It is theoretically possible to make the bender and return mirror assembly turn about a vertical axis, but such a module will be unsuited to the creation of a broad beam keeping a good cutoff in the field.

Preferably, according the invention, in particular for slanting headlights P with light sources S inclined as in FIG. 3, the surfaces of the collecting mirror 6, of the bender 7 and of the return mirror 8 are conjugate surfaces as disclosed below.

The collecting mirror 6 is designed to transform a spherical wave surface issuing from the center of the light source S into an arbitrary wave surface expressed by a two-dimensional line that then defines the edge of the bender 7. In practice, a toric wave surface is chosen for the arbitrary wave surface and the convex bender edge C is then circular; this solution, the simplest, allows analytical calculation and offers a parameter that facilitates the horizontal spread corresponding to the major radius of the torus. A convex bender edge C is chosen, seen from the outside of the headlight, which has a plane of symmetry common with the emitter of the light source S.

The return mirror 8 is determined so as to convert this wave surface into a cylindrical wave surface of vertical axis having any curve C' (FIG. 6) for a cross-section.

The curve C' characterizing the wave emerging from the module is chosen so as to at least partially compensate for the horizontal inclination α of the plane of the LED or LEDs with respect to the axis L of the vehicle. This curve C' serves to regulate the horizontal spread of the beam.

This concept leads to an output beam of axis X-X (FIG. 11) offset angularly, by 30° in the example in question, with respect to the direction perpendicular to the plane of the emitter of trace Δd in a plane shown in FIG. 11.

The assembly makes it possible to create a broad emerging beam with a sharp cutoff line, despite the horizontal inclination of the light source S.

As can be seen in FIG. 10, the apparent contour of the return mirror 8 in orthogonal projection onto the vertical plane of symmetry of the collecting mirror 6 and bender 7 is delimited by: a lower horizontal segment of reduced length; an upper horizontal segment of greater length; a curved rear edge 8a convex towards the rear; a curved front edge 8b concave towards the front, more inclined to the horizontal in its top part than in its bottom part.

The apparent contour of the return mirror 8 in horizontal projection, visible in FIG. 11, is delimited: towards the front by a transverse edge 8c; towards the rear by an edge 8d concave towards the rear; and on the sides by two substantially rectilinear segments converging towards the rear.

In front view, according to FIG. 12, the return mirror 8 has a contour substantially in the form of a parallelogram, the bottom and top sides of which are horizontal, the other two sides being respectively convex to the left and concave to the right.

Figure 8:
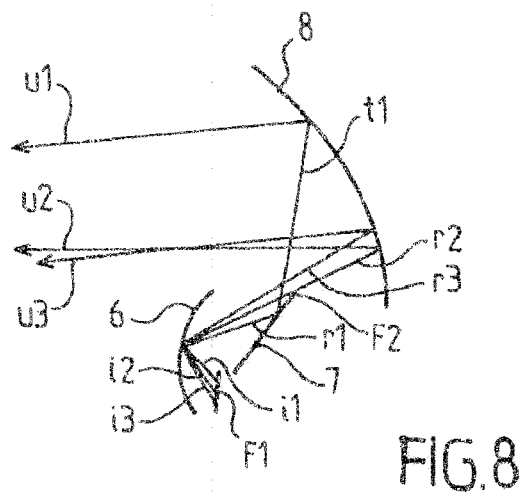
FIG. 8 is a schematic view in vertical section, along the line VIII-VIII in FIG. 9, of a module according to the invention with light ray paths.

Referring to FIG. 8, various possible cases for the paths of the light rays can be seen.

A ray i1, issuing from a point situated above the first focus F1 of the collecting mirror 6, is reflected in a ray r1 that strikes the bender 7 below its top edge and therefore below the second focus F2. The ray r1 is reflected in a ray t1, which is reflected by the return mirror 8 in a descending ray u1.

This case is also illustrated in FIG. 5.

A ray i2 emitted from the second focus F2 (situated at the center of the light source S) is reflected in a ray r2 which is tangent to the top edge of the bender 7 without being diverted and is reflected by the return mirror 8 in a horizontal ray u2 corresponding to the cutoff edge of the beam.

A ray i3 coming from a point of the light source S situated below the center, and therefore below the first focus F1, is reflected by the collecting mirror 6 in a ray r3 that passes above the top edge of the bender 7. This ray r3 is reflected by the return mirror 8 in a descending ray u3.

It is thus clear that the emerging beam is situated below a cutoff edge corresponding to the horizontal plane passing through the ray u2.

The cutoff edge is sharp and the beam is broad, its angular extent preferably being at least 30° on the outside of the vehicle.

Figure 9:
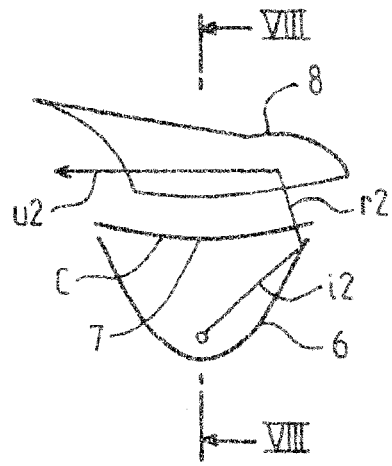
FIG. 9 is a schematic view from above, with parts in section, of elements of a module.

FIG. 9 illustrates in plan view the path of the ray i2 reflected at r2 and then u2.

Figure 13:
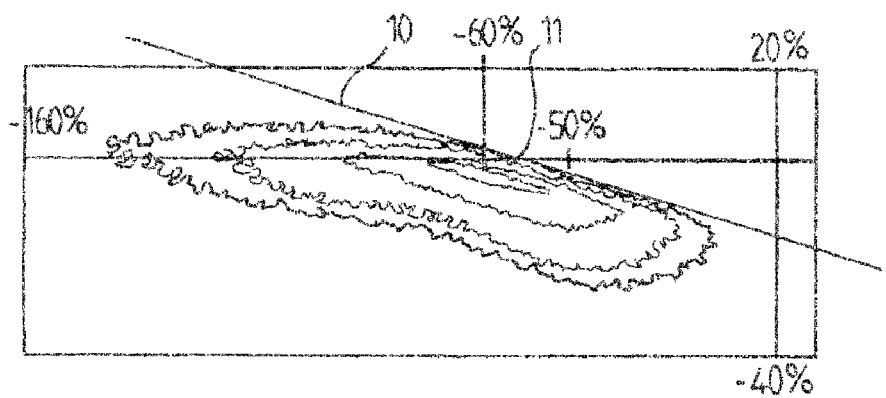
FIG. 13 shows a network of isolux curves obtained with a module with inclined light source, without correction.

The light source S formed by one or more LEDs has a not significant extent: this is because a flat emitter can have a rectangular shape 5.4 mm×1 mm. Light rays can then pass directly above the bender 7 and other rays be reflected above the bender 7. These rays are not necessarily reflected below a horizontal line but in fact below an inclined straight line 10, as illustrated in FIG. 13, intersecting the horizontal at a point 11. This point 11 corresponds to the angle α of horizontal inclination of the system. The graduation of the horizontal axis is effected in values of the tangents of the angles of horizontal inclination, expressed as a %. For an inclination of 30°, tan 30°=0.57, that is to say 57%, which corresponds substantially to the position of the point 11 in FIG. 13.

The network of isolux curves of FIG. 13 shows an inclination to the horizontal, with on the left some of the curves situated above the horizontal cutoff plane.

Figure 14:
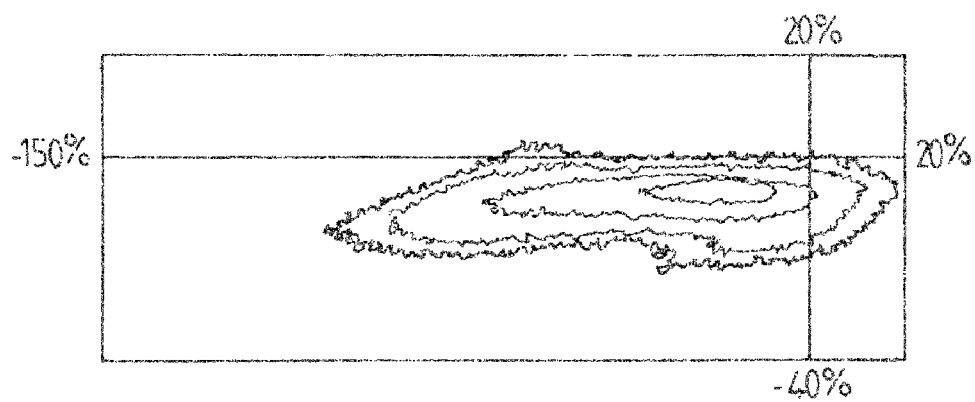
FIG. 14 shows a network of isolux curves similar to the one in FIG. 13 but with correction.
Figure 15:
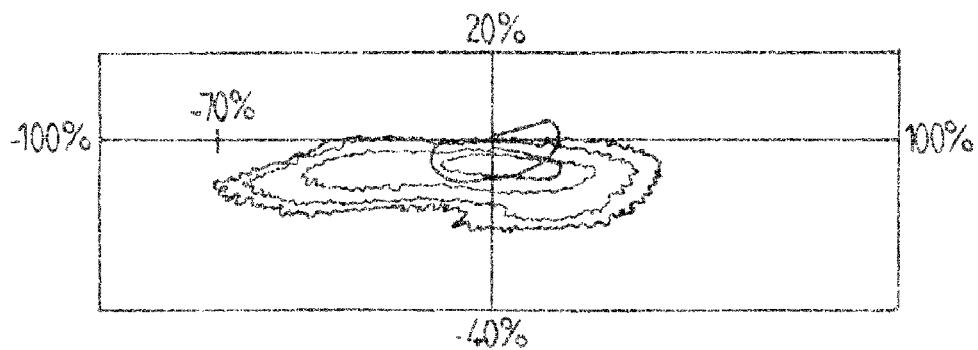
FIG. 15 show a network of isolux curves corrected and centered.
Figure 16:
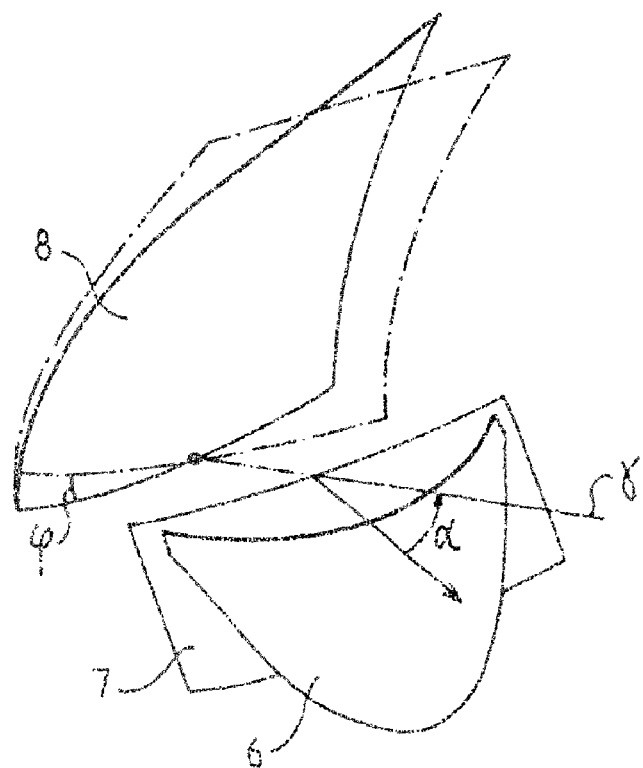
FIG. 16 is a perspective view substantially in three-quarters front view of a module according to the invention illustrating the rotation of the return mirror.

Advantageously, the beam is "straightened up" by making the return mirror 8 turn about the optical axis γ (FIG. 16) of the system. This optical axis γ passes through the center of the edge of the bender 7 and is inclined horizontally, to the longitudinal axis of the vehicle, by the same angle α as the plane of the LEDs as illustrated in perspective in FIG. 16. The return mirror 8, after rotation, is shown in solid lines, while the return mirror 8, before rotation, is shown in dot and dash lines. Then the network of isolux curves illustrated in FIG. 14 is obtained, which is situated below the horizontal cutoff line. After centering on the longitudinal axis of the vehicle, the network of curves of FIG. 15 is obtained. The principle is as follows: the calculations are made and simulation is carried out in a reference frame whose axis corresponds to Δd. A beam offset to the left in this reference frame is created so that, in the vehicle reference frame, the beam is substantially centered.

Finally there is obtained a beam almost entirely situated on the opposite side to the inclination of the system and which makes it possible to procure for a headlight using such modules a minimum of light towards the inside of the vehicle, that is to say towards the left for a right-hand headlight as illustrated in FIG. 15. In the previous example, calculated for 300 and which would be used in a headlight having an actual horizontal inclination of 15°, the concentration spot and the maximum are brought back to the axis whilst keeping 35° of width towards the inside of the vehicle as illustrated in FIG. 15 (tan 35°=0.69, that is to say 69%).

Figure 17:
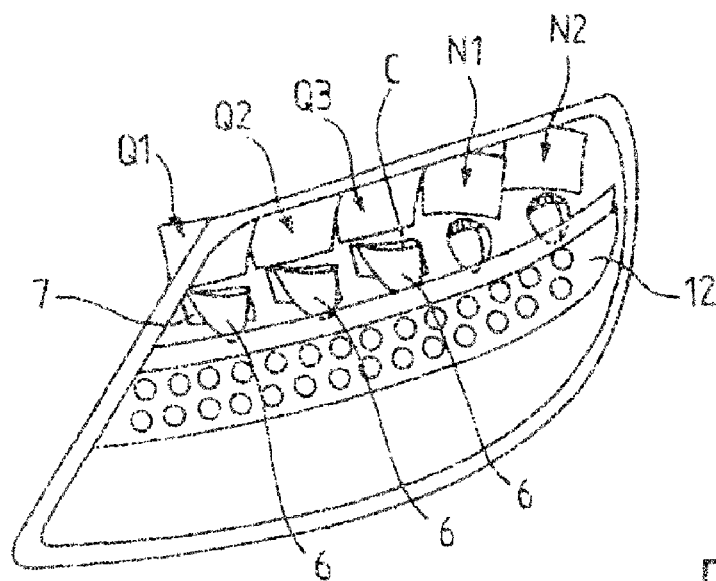
FIG. 17 is a schematic view of a left-hand DBL headlight comprising three fixed modules and two rotatory modules.

FIG. 17 shows a left-hand DBL headlight according to the invention. This headlight comprises: towards the inside of the vehicle, that is to say on the side closed to the longitudinal geometric axis of the vehicle, three fixed modules Q1, Q2, Q3 like the module M described previously. These three fixed modules Q1, Q2, Q3 inclined at 30° or 40° with respect to the transverse direction T of the vehicle help to form the wider part 3 of the beam in FIG. 1. The external part of the headlight comprises two modules N1, N2 rotating about a vertical axis according to the turning angle of the front wheels of the vehicle. These modules N1, N2 create the central part 1 of the beam of FIG. 1 with a V-shaped cutoff and concentration. A band 12 situated in front of a neutral zone formed by the collecting mirrors 6 can be used for another function, for example town lighting.

The calculations of the mirror surfaces, in particular of the return mirror 8 making it possible to obtain a cylindrical wave surface with a curve C', are given in the following pages with reference to FIGS. 6 and 7.

On the representation in perspective in FIG. 6, the vertical axis is designated by η, the axis parallel to the longitudinal direction L of the vehicle is designated by ζ, and the axis parallel to the transverse direction is designated x. The origin of the trirectangular trihedron is merged with the focus F2 common to the mirrors 6 and 8. M is a point on the curve C'.

FIG. 7 is a representation in orthogonal projection on the horizontal plane of the axes x and ζ. The curve C' is an arc of a circle of radius R, the center of which is on the axis ζ, at −R. Any point P, of altitude $\eta_p$, is projected onto the horizontal plane at a point of coordinates $x_p$ and $\zeta_p$.

Calculation of Surfaces

Exit Wave Surface:

Cylinder of axis η and cross-section $\zeta_o(x) = \zeta_c(x) + x \tan \phi$ with φ=angle of inclination.

$$\text{tangent at } M = \begin{pmatrix} 1 \\ \frac{\partial \zeta_c}{\partial x} + tg\varphi \end{pmatrix}$$

If ($\vec{p}, \vec{\eta}$) are directing vectors of the plane normal at M to the trace C' of the exit wave surface in η=o, $$\vec{p} = \frac{1}{\sqrt{1+\left(\frac{\partial \zeta_o}{\partial x}+tg\varphi\right)^2}} \begin{pmatrix} 1 \\ \frac{\partial \zeta_c}{\partial x}+tg\varphi \\ o \end{pmatrix} \wedge \begin{pmatrix} o \\ o \\ 1 \end{pmatrix}$$

$$\begin{pmatrix} \frac{\partial \zeta_o}{\partial x}+tg\varphi \\ -1 \\ o \end{pmatrix}$$

For any M' belonging to the wave surface such that (M, M') is parallel to η, the ray normal to the wave surface at M' has – $\vec{p}$ (M) as directing vector.

Wave Surface of the Edge of the Bend:

This is arbitrary chosen to be toric (see FIG. 7).

Optical path of this surface at any point P: $(x_p, \zeta_p, \eta_p)$ $$[\sqrt{x_p^2+(\zeta_p+R)^2}-R]^2+\eta_p^2=d^2$$

Optical Equation:

If P=M'+λ $\vec{p}$ is a point on the reflector

λ+d=k whence $d^2=k^2+\lambda^2-2k\lambda=\eta_{M'}^2+x_p^2+(\zeta_p+R)^2+R^2-2R$
$\sqrt{x_p^2+(\zeta_p+R)^2}(\eta_p=\eta_{M'})$ $x_p^2=\lambda^2 p_x^2+\lambda 2 x_M p_x+x_M^2$ $(\zeta_p+R)^2=\lambda^2 p_\zeta^2+\lambda 2(\zeta_M+R)p_\zeta+(\zeta_M+R)$ $x_p^2+(\zeta_p+R)^2=\lambda^2+\lambda 2(x_M p_x+(\zeta_M+R)p_\zeta)+x_M^2+(\zeta_M+R)^2$ The above equation then becomes $$2R\sqrt{x_p^2+(\zeta_p+R)^2} = \underbrace{2\lambda(x_M p_x+(\zeta_M+R)p_\zeta+k)+x_M^2}_{A}+\underbrace{(\zeta_M+R)^2+\eta_{M'}^2+R^2-k^2}_{B}$$

$4R^2[x_p^2+(\zeta_p+R)^2]=4A^2\lambda^2+4AB\lambda+B^2$ $4(R^2-A^2)\lambda^2+4\lambda[2R^2[x_M p_x+(\zeta_M+R)p_\zeta]-AB]+$ $[x_M^2+(\zeta_M+R)^2]4R^2-B^2=o$ whence λ and P if $\frac{\partial \zeta_c}{\partial x}(o)+\tan\varphi=o, k=2f$ Calculation of f: the calculation is made with the objective of having a height H and to intercept the last ray reflected by the bender 7 (calculation in the hypothesis indicated above, in terms of x=0, and therefore for a parabolic arc), so that all the rays emitted by the light source S towards the collecting mirror 6 are reflected/returned outside the module The module according to the invention therefore makes it possible to obtain low beams or some of the low beams, both low beams according to European regulations and according to American regulations.

It is also possible to envisage the production of a main-beam headlight comprising a lighting module described previously but in which the return mirror 8 is situated essentially below the collecting mirror 6 when the module is in place on the vehicle. Such a module would correspond to the one shown in FIG. 5 but reversed according to a symmetry with respect to a horizontal plane comprising the optical axis X-X of the module. This lighting module of the main beam type thus makes it possible to create a cutoff delimiting the bottom part of the light beam emitted by the lighting module. Preferentially this lighting module of the main beam type is associated with a lighting module of the low beam type, according to the invention or not.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A lighting module for a motor vehicle headlight, designed to give an output beam with cutoff, in particular a low beam, this module comprising:
   at least one light source for generating a light beam;
   a collecting mirror having a collecting mirror reflective surface for receiving at least some of said light beam from said at least one light source;
   a bender having a bender reflective surface and a cutoff edge, said bender being formed by at least a portion of a cylinder having a convexity towards said collecting mirror; and
   a return mirror having a return mirror reflective surface for receiving at least a portion of said light beam from at least one of said collecting mirror or said bender reflective surface so that said return mirror produces said output beam with cutoff;
   wherein said at least one light source emits said light beam toward said collecting mirror reflective surface which receives at least a portion of said light beam and directs at least some of said light beam towards said bender reflective surface and said cutoff edge;
   said return mirror reflective surface of said return mirror receiving at least some of said light beam from said bender reflective surface or said collecting mirror reflective surface and directing at least a portion of said light beam towards a lens so that said at least a portion of said light beam exits said lens towards an area outside the vehicle.

2. The lighting module according to claim 1, wherein said cylinder at least in part of said bender has a generatrix direction comprising an intersection of a vertical left/right symmetry plane of said at least one light source and of a mid-plane of said at least one light source.

3. The lighting module according to claim 2, wherein said return mirror is situated essentially above said collecting mirror when said lighting module is in place on the vehicle.

4. The lighting module according to claim 2, wherein said at least one light source is formed by a light emitting diode comprising at least one flat emitter or by several light emitting diodes, said at least one flat emitter or said several light emitting diodes are situated on the same plane.

5. The lighting module according to claim 2, wherein said at least one light source is disposed so as to emit a light beam whose mean direction, in orthogonal projection onto a horizontal plane, is inclined with respect to a longitudinal axis of the vehicle and moves away from said longitudinal axis towards said outside of the vehicle.

6. The lighting module according to claim 1, wherein said return mirror is situated essentially above said collecting mirror when said lighting module is in place on the vehicle.

7. The lighting module according to claim 1, wherein said at least one light source is disposed so as to emit said light beam whose mean direction, in orthogonal projection onto a horizontal plane, is inclined with respect to a longitudinal axis of the vehicle and moves away from said longitudinal axis towards said area outside of the vehicle.

8. The lighting module according to claim 7, wherein conjugate surfaces are determined so as to compensate for the inclination of the mean direction of emission of said at least one light source and to give an emerging beam whose axis is substantially parallel to a geometric axis of the vehicle when the module is in place on the vehicle.

9. The lighting module according to claim 7, wherein said collecting mirror has a shape approaching an ellipsoidal shape, having a first focus at which, or in the vicinity of which, said at least one light source is disposed in order to illuminate towards said collecting mirror, and a second focus situated on an optical axis of said lighting module, said cutoff edge of said bender passing through said second focus of said collecting mirror.

10. The lighting module according to claim 1, wherein said collecting mirror has a shape approaching an ellipsoidal shape, having a first focus at which, or in the vicinity of which, said at least one light source is disposed in order to illuminate towards said collecting mirror, and a second focus situated on an optical axis of said lighting module, a cutoff edge of said bender preferably passing through said second focus of said collecting mirror.

11. The lighting module according to claim 10, wherein said return mirror has a shape approaching a parabolic shape, in order to produce the output beam with cutoff towards the front, said return mirror having a focus merged with, or situated in the vicinity of, said second focus of said collecting mirror, the cutoff edge of said bender passing through the focus of said return mirror or in its vicinity.

12. The lighting module according to claim 10, wherein said collecting mirror is determined so as to convert the spherical wave surface issuing from a center of said at least one light source into a toric wave surface corresponding to a bender with a circular edge.

13. The lighting module according to claim 1, wherein said return mirror has a shape approaching a parabolic shape, in order to produce an output beam with cutoff toward said front of the vehicle, said return mirror having a focus merged with, or situated in the vicinity of, a second focus of said collecting mirror, the cutoff edge of said bender passing through the focus of said return mirror or in its vicinity.

14. The lighting module according to claim 1, wherein said collecting mirror is determined so as to convert a spherical wave surface issuing from a center of said at least one light source into a toric wave surface corresponding to a bender with a circular edge.

15. The lighting module according to claim 1, wherein said return mirror is turned through an angle about an optical axis of the system in order to straighten up an emerging beam with respect to a horizontal axis.

16. The lighting module according to claim 1, wherein said at least one light source is formed by a light emitting diode comprising at least one flat emitter or by several light emitting diodes, all of said at least one flat emitter or said several light emitting diodes are situated on the same plane.

17. The lighting module according to claim 16, wherein an angular opening of an emerging beam of the module is at least 30° on said outside of the vehicle.

18. The lighting module according to claim 1, wherein an angular opening of an emerging beam of the module is at least 30° on the outside of the vehicle.

19. A low beam headlight, that comprises at least one lighting module according to claim 1.

20. The low beam headlight according to claim 19, wherein said low beam headlight comprises as a light source light emitting diodes with flat emitters that are situated on the same plane, inclined horizontally with respect to a geometric axis of the vehicle.

21. The low beam headlight according to claim 20, wherein said plane is inclined horizontally with respect to a transverse direction, orthogonal to a geometric axis of the vehicle, at an angle of between 2° and 40°.

22. The low beam headlight according to claim 19, of the DBL type, comprising orientable modules for creating a central zone of a beam with a V-shaped cutoff, wherein said low beam headlight comprises fixed modules with a horizontal cutoff line and with sufficient beam width to frame the central zone in extreme turning positions.

* * * * *